Patented Sept. 4, 1934

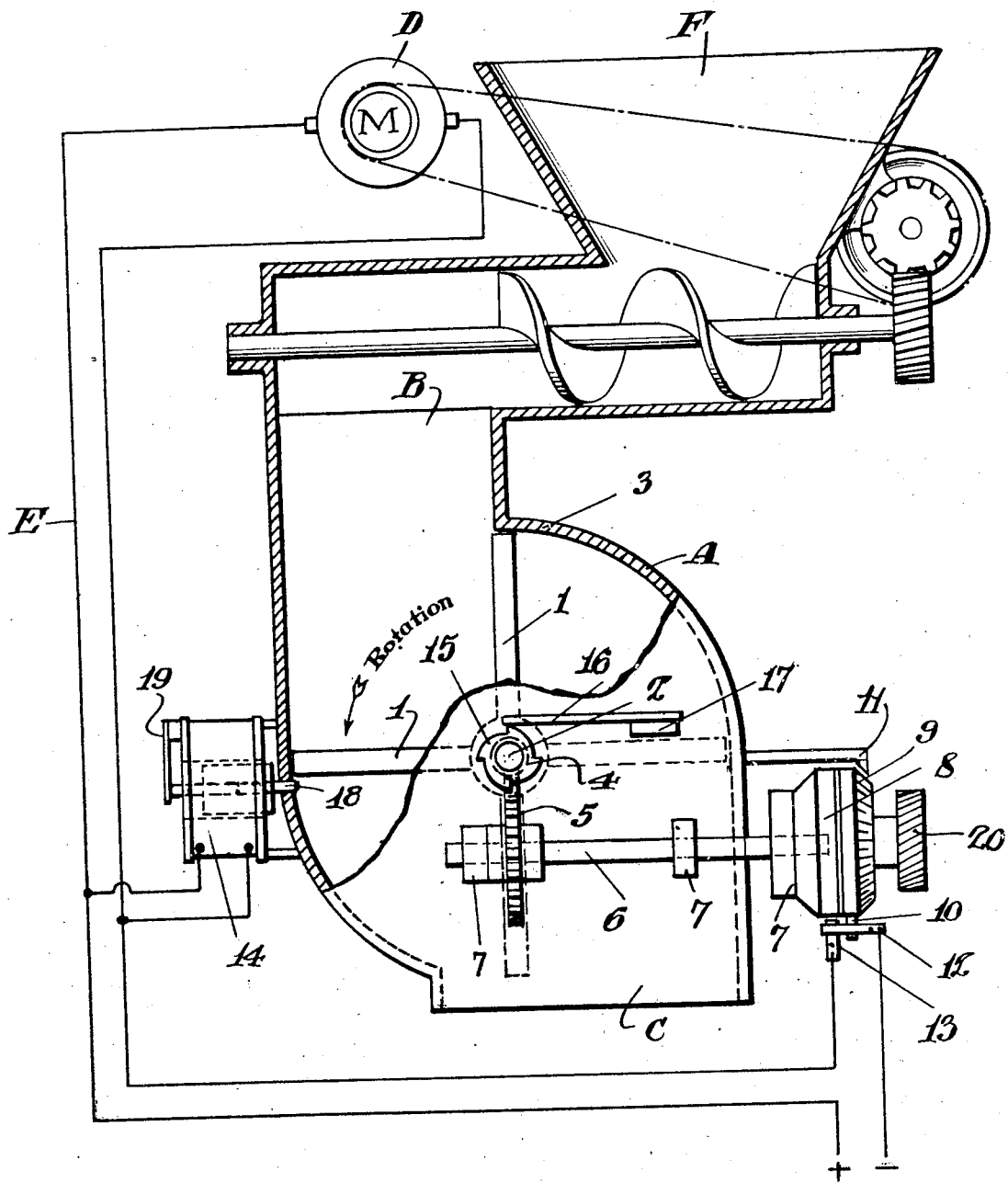

1,972,808

UNITED STATES PATENT OFFICE 1,972,808

AUTOMATIC MEASURING DEVICE

Henry Waterstone, Richwood, W. Va.

Application November 25, 1932, Serial No. 644,333

2 Claims. (Cl. 221—101)

The invention relates to an automatic measuring device and more especially to an electro-mechanical measurer for powdered or granular material.

The primary object of the invention is the provision of a device of this character, wherein powdered or granular material, such as flour and similar substances, during transit for delivery thereof, can be measured into determined quantities and this being had without the use of scales or hoppers as ordinarily required, the device being of novel form and electro-mechanically operated.

Another object of the invention is the provision of a device of this character which is extremely simple in construction, thoroughly reliable and efficient in its purpose, strong, durable, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

The view in the drawing is a side elevation of the device partly in section and showing diagrammatically the electric equipment in association with said device.

Referring to the drawing in detail, the device comprises a housing A of a shape and construction to accommodate therein a four-bladed rotor or wheel 1, the housing above the rotor or wheel being formed with an inlet B, while below the wheel is the outlet C. This inlet B is in communication with a suitable material conveyor or feeder for powdered or granular materials and the same is controlled for operation by a motor D of the electric type arranged within a circuit E normally open and receiving its current from any conventional electric supply. The circuit E is opened and closed by a switch hereinafter fully described.

The bladed wheel or rotor 1 is keyed or splined to a shaft 2 suitably journaled in the housing A. The material to be measured is let into the housing through the inlet B and gravitates upon a confronting blade in the path thereof so that upon unbalancing the rotor or wheel the latter will be caused to rotate for a purpose presently described.

Upon the shaft 2 is a worm gear 4 meshing with a companion worm gear 5 fixed to a shaft 6 below the shaft 2 and at right angles thereto. This shaft 6 is equipped with a friction clutch 7 including the parts 8 and 9, the latter being in the form of a setting dial which on the outer face thereof is suitably scaled to be indicative of determined quantities to show the amount of material which may be passed by the rotor or wheel in the operation of the device. Coacting with the dial 9 is a pointer 11, the same being suitably fixed to the housing A and disposed to coact with the scale face of said dial in the setting of the latter, which is manually controlled.

This dial 9 is formed with a striker 10 for controlling the switch included in the circuit E to open such circuit. The switch includes the flexible contact 12 and the stationary contact 13. When the striker 10 engages the flexible contact 12, it will move away from the stationary contact 13 and thereby opening the circuit E by the switch and in this the motor D will be stopped, thus shutting off the conveyor or feeder mechanism, as should be apparent.

Movable through a suitable clearance in the housing A to be projected into the path of the blades of the rotor or wheel 1 is the core of an electric magnet 14, the same being included in the circuit E and energized on the closing of said circuit and deenergized on the opening thereof, the movable core of said magnet, when projected into the path of the blades of said wheel or rotor, will lock the same against rotation, the core being projected when the magnet 14 is deenergized. On energizing the magnet 14 the core thereof will be drawn into the same and thus release the rotor or wheel 1.

Mounted on the shaft 2 of the rotor or wheel 1 is a multiple cam 15 against which coacts a compensating spring 16 functioning as a braking medium to take care of the proper unbalancing of the rotor or wheel 1 in conformity with the weight of the load of material imposed upon any one of its blades and in this fashion such rotor or wheel is prevented from coasting. The spring 16 is arranged upon a suitable support 17 therefor.

The core 18 of the magnet 14 is thrust into locking position through the medium of a spring 19 when the magnet 14 is deenergized.

In the working of the device the dial 9 is manually set by a hand knob 20 thereon with relation to the pointer 11 to the amount of material to be measured by the wheel or rotor 1 and on setting such dial 9 the switch of the circuit E is closed, thus the motor D is started for the feeding of material by a conveyor F through the inlet B of the housing A and the confronting blade of the rotor or wheel will trap the material until the weight thereof is in conformity with the setting of such dial, the building up of the material upon the wheel or rotor taking place until the striker 10 acts upon the switch to open the same, whereupon the motor D is stopped and the core 18 of the magnet 14, which is in releasing position when said magnet is energized, permitting the measured material to be discharged through the outlet C will then be thrown to locking position to stay the further measuring action of the wheel or rotor 1 as the next blade thereof following the load carrying blade will be engaged by said core 18 and thus hold the rotor or wheel passive.

What is claimed is:

1. In a device of the character described, a housing providing a material passage therethrough, a bladed rotor journaled in said housing so that its blades may be projected into the material passage, a manually controlled dial having frictional clutch connection with the rotor for coaction therebetween, an electric circuit having a switch, a motor in said circuit for operating a conveyor for feeding material to the housing means on the dial to operate said switch for the opening of the circuit, and an electric magnet arranged in said circuit and having a core for movement into locking position with respect to said rotor.

2. In a device of the character described, a housing providing a material passage therethrough, a bladed rotor journaled in said housing so that its blades will project into the material passage, a manually controlled dial having frictional clutch connection with the rotor for coaction therebetween, an electric circuit having a switch, a motor in said circuit for operating a conveyor for feeding material to the housing means on the dial to operate said switch for the opening of the circuit, an electric magnet arranged in said circuit and having a core for movement into locking position with respect to said rotor, and means coacting with the rotor to prevent coasting thereof.

HENRY WATERSTONE.